United States Patent [19]
Edgar

[11] Patent Number: 5,373,455
[45] Date of Patent: Dec. 13, 1994

[54] POSITIVE FEEDBACK ERROR DIFFUSION SIGNAL PROCESSING

[75] Inventor: Albert D. Edgar, Austin, Tex.

[73] Assignee: International Business Machines Corporation, Armonk, N.Y.

[21] Appl. No.: 153,798

[22] Filed: Nov. 17, 1993

Related U.S. Application Data

[63] Continuation of Ser. No. 706,466, May 28, 1991, abandoned.

[51] Int. Cl.$^5$ ............................................. G06F 15/20
[52] U.S. Cl. .................................. 364/571.01; 364/514
[58] Field of Search .................... 364/571.01–571.08, 364/514, 572, 574; 382/56; 375/28, 30; 341/112, 116

[56] References Cited

U.S. PATENT DOCUMENTS

| Re. 31,720 | 10/1984 | De Freitas et al. | 375/30 |
|---|---|---|---|
| 4,099,122 | 7/1978 | van Buul | 375/30 |
| 4,186,384 | 1/1980 | Acker | 375/28 X |
| 4,217,609 | 8/1980 | Hatori et al. | 378/28 X |
| 4,229,820 | 10/1980 | Enomoto | 375/28 |
| 4,254,502 | 3/1981 | De Freitas et al. | 375/30 |
| 4,270,027 | 5/1981 | Agrawal et al. | 375/28 X |
| 4,313,204 | 1/1982 | DeFreitas | 375/28 |
| 4,519,085 | 5/1985 | Catros | 375/28 |
| 4,807,250 | 2/1989 | Tanaka | 375/28 |
| 5,020,120 | 5/1991 | Weldy | 382/56 |
| 5,055,843 | 10/1991 | Ferguson, Jr. et al. | 375/28 X |
| 5,079,551 | 1/1992 | Kimura et al. | 375/28 X |

FOREIGN PATENT DOCUMENTS 2000705 4/1990 Canada.
WO8906080 6/1989 WIPO.

OTHER PUBLICATIONS

IBM Technical Disclosure Bulletin vol. 28, No. 3, Aug. 1985.
IBM Technical Disclosure Bulletin vol. 30, No. 10, Mar. 1988.
Proceedings of the S.I.D. vol. 24, No. 3, 1983, Los Angeles, Calif. pp. 253–258. C. Billotet-Hoffmann, et al.: 'On the error diffusion technique for electronic halftoning'.

Primary Examiner—Ellis B. Ramirez
Attorney, Agent, or Firm—Casimer K. Salys

[57] ABSTRACT

A method for processing signals to diffuse quantization error spatially or temporally. Positive feedback of the quantization error is used to reduce the relative noise for the low frequencies of the spectrum. According to a preferred implementation in a two-dimensional spatial application involving a base pixel and three adjacent orthogonally arranged pixels, error attributable to quantization at the base pixel location is provided as positive feedback for the quantization of the diagonally adjacent pixel. Offsetting and complementary values of the quantization error are also diffused to the remaining two diagonally positioned pixels. The composite of the four pixels forms a square with a zero net error diffusion along the horizontal, vertical and diagonal orientations.

12 Claims, 8 Drawing Sheets

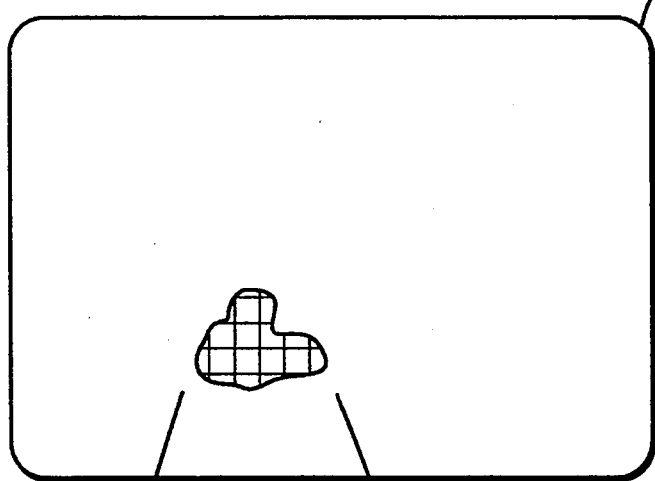
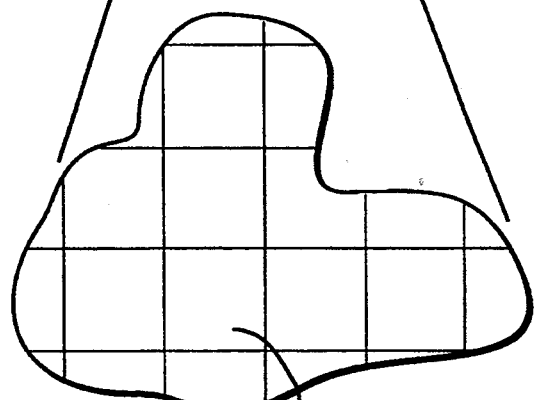
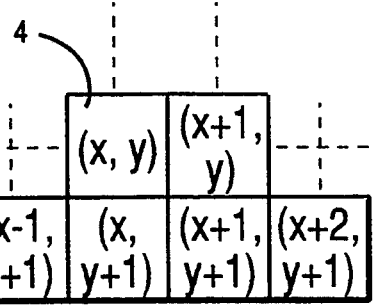
FIG. 4

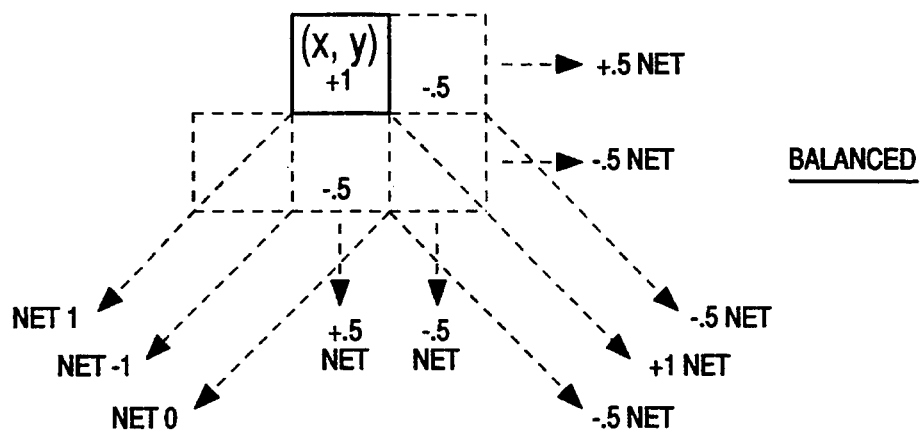
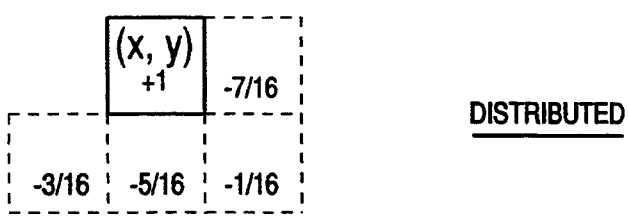
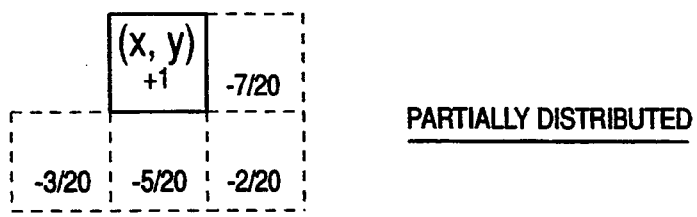
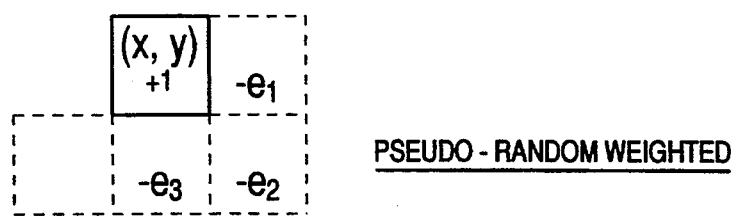
FIG. 5

2-D ERROR DIFFUSION - POSITIVE FEEDBACK

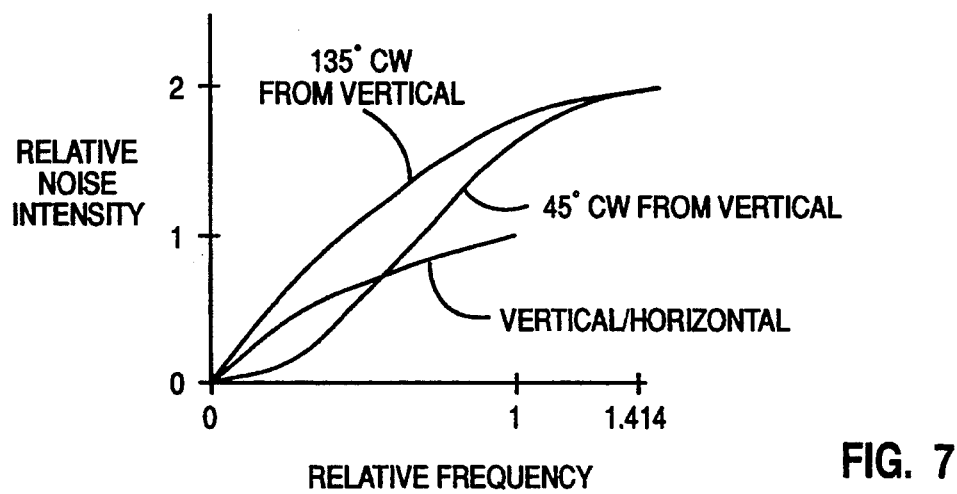
FIG. 7
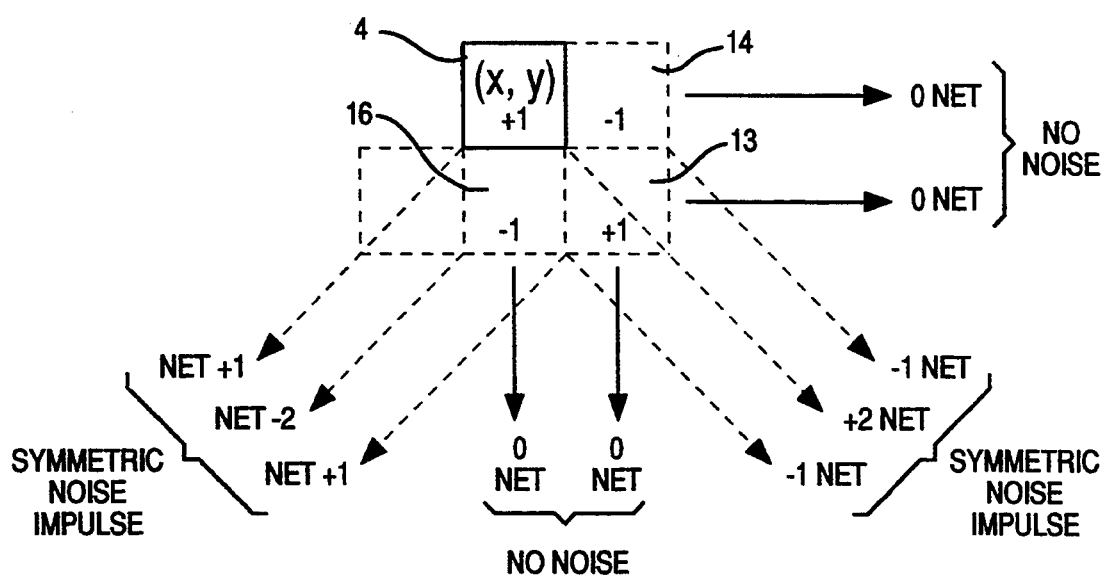
FIG. 8  POSITIVE FEEDBACK

POSITIVE FEEDBACK ERROR DIFFUSION SIGNAL PROCESSING

This is a continuation of application Ser. No. 07/706,566 filed May 28, 1991 now abandoned.

BACKGROUND OF THE INVENTION

The present invention relates generally to signal processing. More particularly, the invention is directed to a method for diffusing error, such as quantization error generated during analog to digital conversion of single or multiple dimensional signals.

The conversion of analog signals to digital format results in a quantization error for each conversion in which the analog value and nearest digital value do not correspond exactly. The concept of error diffusion averages the error to zero over multiple samples, irrespective of whether the averaging is conducted in a spatial or temporal context. Error diffusion has been considered at length in textbooks on time related signal sampling theory. More recently the concepts have been applied to video processing of spatially related multiple dimension signals, such as those associated with the gray scale intensities of pixels on a video display screen. Though most prevalent in quantization applications, the fundamental concept of error diffusion is applicable to any signal process where the difference between the input signal and an approximation thereof produces an error value. For example, when a sublimation printer attempts to deposit a dye density of 0.5, but 0.6 actually is deposited, the error value is 0.1. The ensuing description will refer to all such error values generally as quantization errors.

The conventional application of error diffusion involves the use of negative feedback, whereby the quantization error occurring at a first time, or spatial location, is conveyed in a complementary value to one or more time successive or spatially adjacent quantization calculations. The underlying objective is to diffuse or spread the quantization error and thereby produce a net average value of zero error referenced to an extended time or displacement.

Error diffusion has become particularly popular and valuable for digital signal processing of image data, where the original images subject to digital quantization exhibit gray scale or halftone patterns. For example, the article entitled "Damped Error Diffusion in Binary Display", as appeared in the *IBM Technical Disclosure Bulletin*, Vol. 28, No. 3, August 1985, pages 1290–1291, proposes that the gray scale image error subject to diffusion be decayed by the inclusion of a damping effect. The noted benefit was to eliminate spurious white and dark pixel regions, without introducing artifacts or other patterns. According to the practice defined therein, the error associated with a gray scale analog to digital conversion at a first pixel is diffused in less than 100% proportion to four immediately adjacent pixels.

A second example, Canadian Patent No. 2,000,705, describes a pseudo random refined and weighted method of diffusing error to neighboring pixels in a halftone process using analog to digital conversion. In this practice, the error information is spread according to a defined proportion to the immediately adjacent pixel and the two pixels lying below the base and adjacent pixels.

The error being diffused in these and other similarly practiced methods follows the earlier noted classic principles of negative feedback in the distribution process to average and thereby reduce the prominence of the quantization error at each pixel. Though such prior error diffusion techniques eliminate or minimize the next average quantization error over multiple pixels, the residual artifacts and noise they introduce confirms the need and desirability for a more accurate method of practicing error diffusion.

SUMMARY OF THE INVENTION

The invention to which the claims pertain is a method for practicing error diffusion so as to optimize the match between the quantized image and the frequency characteristics of the data user, for example, the eye of a human observer. In the preferred context of matching the visual perception of a human observer and an image generated from a digitally quantized analog image, it has been determined that the selective use of positive feedback as applied to the quantization error can both improve the image and simplify the quantization procedure.

According to one practice of the invention, the quantization error attributed to the pixel at location (x,y) on a video image is added as a positive feedback value during the quantization of analog data for the pixel at location (x+1,y+1). The positive error feedback value so introduced is offset by the addition of complementary error data during the quantization of the pixels at locations (x,y+1) and (x+1, y). Though the digital format image created by the positive feedback method of the present invention exhibits accentuated levels of high frequency noise in the replicated image, the method also exhibits a unique and useful reduction of the noise level at the low frequency end of the spatial spectrum. Interesting and beneficially, human visual acuity tends to prevail at the lower end of the frequency spectrum. Thus, this unique interaction between the use of positive feedback error diffusion and the frequency related visual acuity of the human observer match so as to better quantify images subject to digital processing.

The positive feedback error diffusion method of the present invention is particularly useful in that it is readily amenable to signal processing without further scaling of quantities or complex pseudo random or weighted data calculations. Though the invention will be described and is likely to find greatest usage in two-dimensional spatial error diffusion associated with video processing, the fundamental concepts are equally applicable to one-dimensional video or audio signal processing. The improvement in low frequency noise at the expense of elevated high frequency noise, which high frequency noise is removable by selective filtration, remains the viable principal throughout.

These and other features of the invention will be more clearly understood and appreciated upon considering the detailed description which follows.

BRIEF DESCRIPTION OF THE DRAWING

FIG. 4 schematically illustrates an arrangement of pixels on a video display screen.

FIG. 5 (schematically illustrates prior art error diffusion as applied to two-dimensional video patterns.

FIG. 7 illustrates by graph the noise versus frequency plots of prior art error diffusion.

FIG. 8 schematically illustrates the application of positive feedback error diffusion to a two-dimensional pattern.

DESCRIPTION OF THE PREFERRED EMBODIMENT

Error diffusion is a method for minimizing analog to digital conversion quantization error over multiple samples by eliminating the net average error. In the normal practice of error diffusion, the analog value of the quantization error is conveyed to the next successive temporal or spatial quantization measurement as a negative feedback value.

Figure 1:
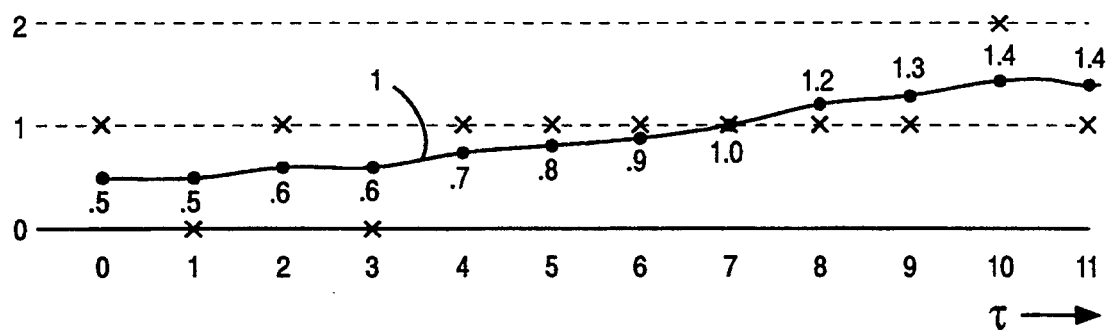
FIGS. 1, 2, and 3 schematically illustrate prior art signals and quantization error.
Figure 2:
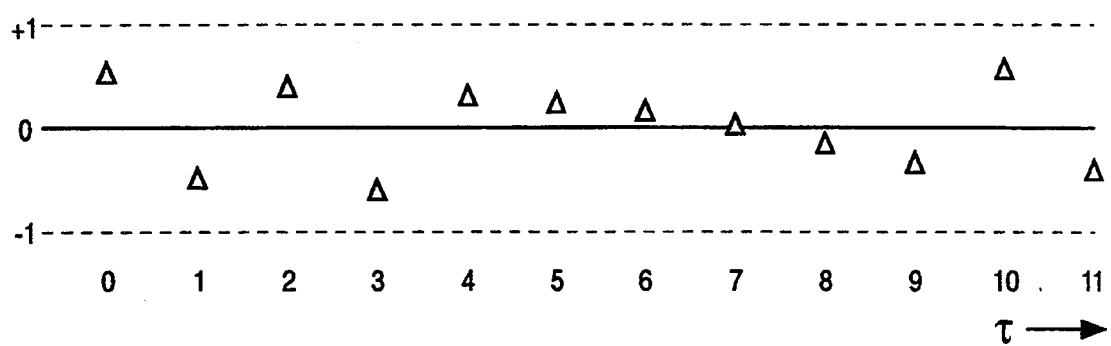

Classical error diffusion and related quantization error are illustrated by the examples depicted in FIGS. 1 and 2. The time related signal represented by line 1 is quantized at time intervals 0-11 to quantization levels corresponding to digital values 0, 1 or 2 based upon the combination of the present measurement and the error diffused from the immediately preceding measurement. For example, the zero value at time t=1 is determined by summing the signal value of +0.5 with a diffused error value of −0.5 from the previous measurement. The points designated fin FIG. 2 illustrate the instantaneous quantization error associated with each time related quantization. As noted earlier, this represents classical single dimensional quantization with error diffusion.

Figure 3:
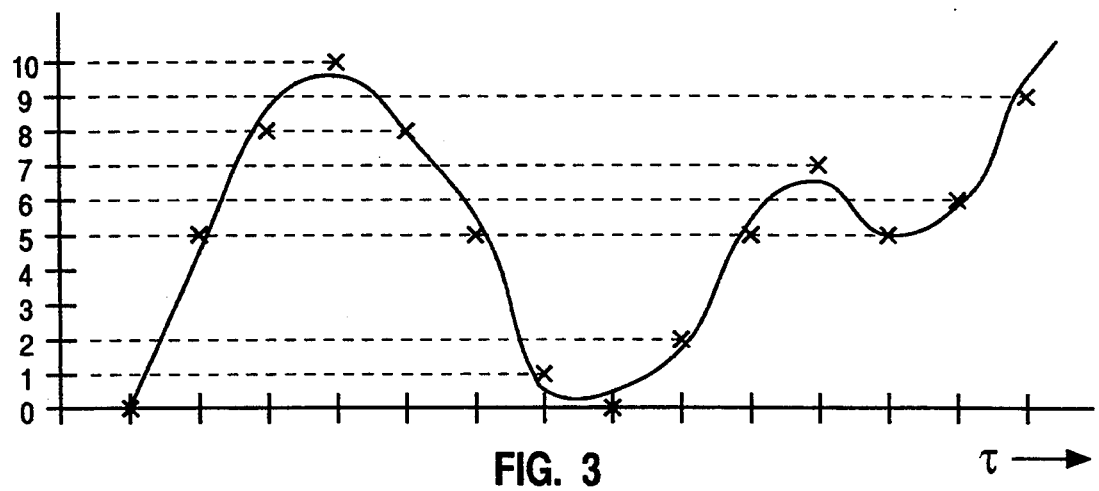

FIG. 3 illustrates that as the number of quantization levels and signal excursions increase, the quantization error becomes more random and uncorrelated between samples.

Given that the invention finds particular usage and value in video image processing, its application and benefits will be framed in the context of error diffusion as applied to the quantization of analog graphics data by pixel as would appear on raster scanned video display screen 2 in FIG. 4. The screen image is composed of multiple pixels 3, which pixels are matrix oriented and may for purposes of description be specified by location in an orthogonal coordinate system referenced to a base pixel 4 at location (x,y). In a practice analogous to the single dimension application of error diffusion during signal quantization, the two-dimensional environment of FIG. 4 suggests multi-dimensional diffusion of quantization error from the base quantization point. The ensuing discussion will presume a diffusion of error from the quantization for base pixel 4 at location (x,y) to other pixels within the display screen. In keeping with causality, error is diffused to pixels which are yet to be quantified.

The ensuing discussion presumes that video display screen 2 scans left-to-right and top-to-bottom, thereby constraining diffusion direction to pixels either below or to the right on the same scan line of the base pixel at (x,y). A commonly used technique to further reduce artifacts in error diffusion is to scan alternately left-to-right and right-to-left in successive rows. Although this technique is not discussed in detail, the implications of the direction reversals on error diffusion as disclosed in the present invention should be apparent to one of requisite skill in the art.

Conventional methods of error diffusion as applied to the two-dimensional image processing environment are depicted in FIG. 5. If the relative value of the error following a quantization of the signal for base pixel (x,y) has a value of +1, then a simple balanced approach to error diffusion involves the distribution of a negative value of the error to adjacent pixels. For the conventional system in which pixels are scanned from left-to-right and from top-to-bottom, the error diffusion operation for a balanced approach increments the quantization measurements for the pixels in positions (x+1, y) and (x,y+1) in amounts of −0.5 of the relative error value. Though simple, this technique produces a balanced output when the net error for the two columns and two rows affected by error diffusion is summed in the horizontal, the vertical, and both diagonal directions. For example, accumulation of the error along the y row provides a net error +0.5, which error is offset by the −0.5 value of the y+1 row. FIG. 5 also illustrates the balance when summed along the other directions.

Unfortunately, this simple error diffusion still leaves a relatively intense level of spatial noise over an extended frequency range, as illustrated in the plot of FIG. 7. In FIG. 7, the noise is plotted for 4 angles. Note that for the horizontal and vertical directions any noise beyond a relative value of 1 is undefined, and for the diagonal orientations any noise beyond a relative value of 1.4 is undefined, in keeping with Nyquist criteria. The noise intensity is both large and broad in frequency spectrum. The relative noise value of "1" on the graph in FIG. 7 represents the value of noise in the absence of any diffusion. Note that the net noise increases with the use of error diffusion, but that the intensity is frequency related with levels less than 1 at low frequencies.

The undesirable frequency characteristics of the balanced approach have led to the development and use of empirically refined error diffusion techniques. The distributed and partially distributed error diffusion approaches depicted in FIG. 5 are illustrative. Both are described in the aforementioned *IBM Technical Disclosure Bulletin*. Unfortunately, the distributed approach to diffusion of negative error is acknowledged to create spurius patterns. The damped or partially distributed error diffusion method, in which less than 100% of the error is distributed, claims to reduce such artifact problems. However, contouring and large area color inaccuracies are commonly introduced. The complexity of the error distribution calculations for a high frequency video environment, and the extent of their distribution, in terms of pixel count, clearly detracts from both distributed approaches.

The pseudo random weighted diffusion of error to which the aforementioned Canadian Patent relates is also schematically represented in FIG. 5. In this case, the negative value of error is provided to three adjacent pixel positions for purposes of compensation during quantization. The respective value for each pixel is derived from a combination of weighting and random factors. The complexity of the approach is clearly apparent from a consideration of the description.

The present invention departs from the norm by applying positive feedback error diffusion compensation, but only following the recognition that such departure can lead to beneficial frequency related noise characteristics. Namely, the positive feedback diffusion of error is acknowledge to increase the relative noise intensity at higher frequencies but has been found to provide a very useful reduction of the relative noise intensity at the low end of the frequency spectrum. The benefits of error diffusion are extended to the realm of frequency selective noise reduction. In the context of video image processing, this relative shift of noise intensity has proven to be quite desirable in that the visual acuity of a human observer tends towards the lower spectrum of the frequencies in question. Thus, positive feedback error diffusion fortuitously matches the frequency characteristics of the human visual system. Furthermore, the frequency selective error diffusion of the present invention does not introduce artifacts, contouring, area inaccuracies or patterning into the image.

Figure 6:
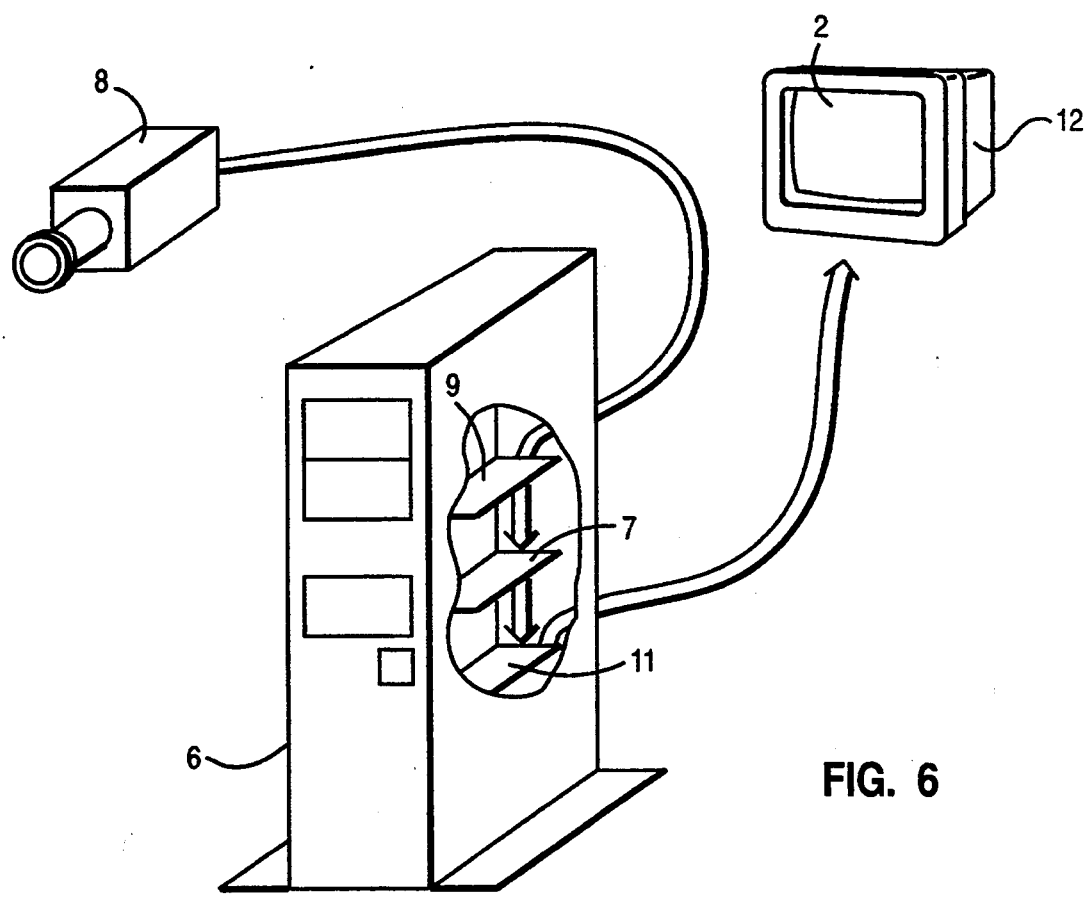
FIG. 6 schematically illustrates hardware for practicing positive feedback error diffusion.

FIG. 6 illustrates a hardware context for practicing positive feedback error diffusion. Workstation 6, such as a model PS/2 manufactured by IBM Corporation, includes central processing unit and memory board 7. A program implementation of the invention resides on, and controls the functions performed by the central processor unit on board 7. Camera 8 captures video images and communicates the images to digitizing card 9 for arrangement into an orthogonal array, as depicted in FIG. 4. In response to the process defined by the program, the central processing unit on board 7 applies positive feedback diffusion to generate a refined version of the image captured by camera 8. The refined image is transmitted to display card 11 for storage and scanned reproduction on screen 2 of monitor 32. Variations on this configuration are possible and expected, such as the replacement of camera 8 with a video scanner, the replacement of monitor 12 with a mass storage device, the substitution of custom logic for the central processor unit and program, and the like.

FIG. 8 illustrates a preferred implementation of the positive feedback error diffusion method to which the present invention relates. According to such two-dimensional spatial implementation, again for a left-to-right and top-to-bottom scanned video display, the normalized error value +1, resulting from the quantization of the analog signal for pixel position (x,y), is provided in equal value and of like sign to the quantization calculation for the diagonally disposed pixel position at location (x+1,y+1). The method further provides for offsetting error diffusion to pixel locations in the same row and in the same column as the base pixel, using the same magnitude as the error of the base pixel but of complementing sign. In the context of FIG. 8, the relative error +1 from base pixel 4 is added to the measured value of the pixel at location 13 and subtracted from the measured values of pixel data at locations 14 and 16 before quantization. The values of the relative error may be set below the base pixel magnitude of 1 to dampen marginal stable error diffusion applications. See FIG. 14.

The diffusion of error according to the arrangement in FIG. 8 exhibits symmetry and provides a net 0 noise profile in the vertical and the horizontal orientations. Noise in the diagonal profile is symmetric in that it is composed of three pulses of successively differing polarity. This reduces the low frequency relative noise while elevating the high frequency constituents, a combination ideally suited to complement the characteristics of the human visual senses. This is particularly desirable in that spurius dots, discernible patterns or other artifacts are substantially eliminated. The ease of calculating the compensation is self evident.

Figure 9:
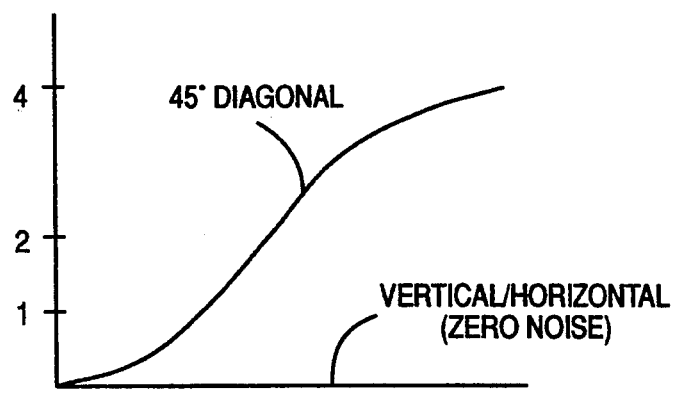
FIG. 9 illustrates by graph the noise versus frequency plots of 2-D positive feedback error diffusion.

The benefits of positive feedback error diffusion in a two-dimensional spatial environment become clear upon recognizing the earlier noted low frequency spatial spectrum dominance of the human visual system and then considering the relative noise versus frequency distribution of two-dimensional positive feedback error diffusion. FIG. 9 shows the noise for positive feedback diffusion for the 4 angles in the same way that FIG. 7 shows the noise for the prior art balanced diffusion. Note that with the practice of positive feedback error diffusion, the horizontal and vertical noise is zero, and the diagonal noise intensity approaches zero at low frequencies as a second order curve. Only at high frequencies is the noise increased. The human eye is least sensitive to noise at high and diagonal frequencies.

Figure 10:
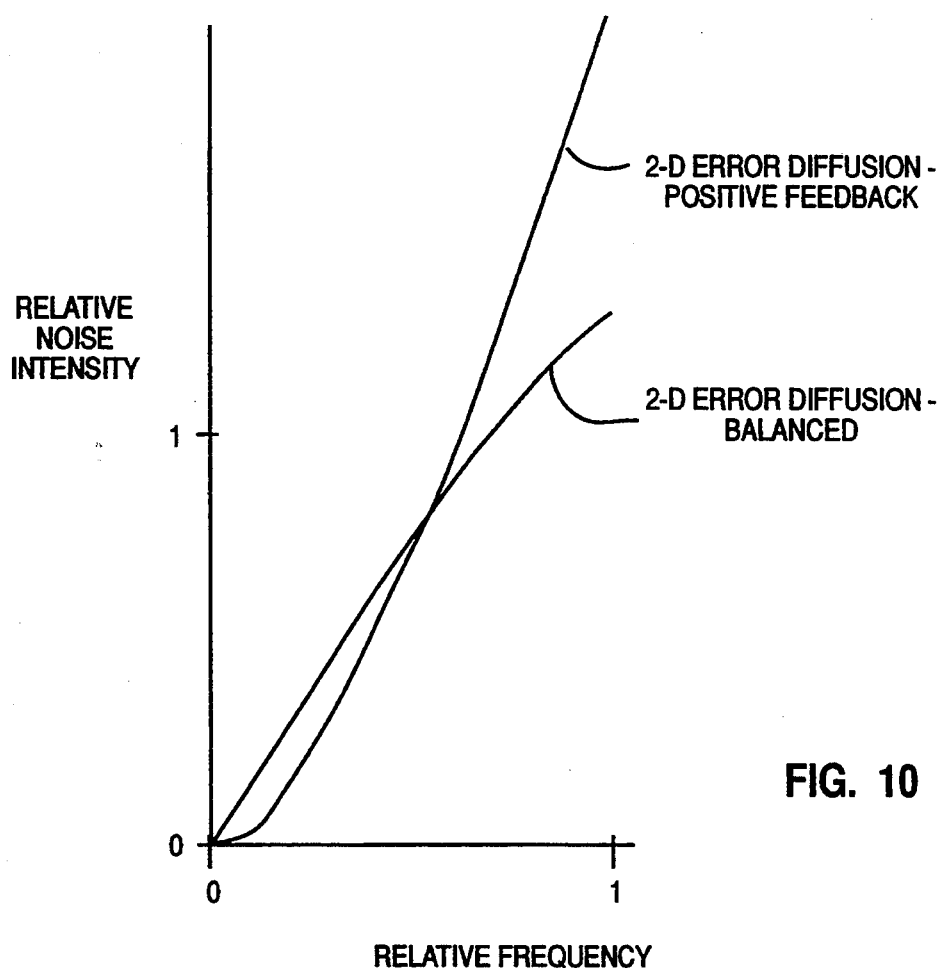
FIGS. 10 compares by graph the noise versus frequency plots of two-dimensional positive feedback error diffusion and prior art error diffusion.

FIG. 10 compares the noise values of FIG. 7, the prior art, and FIG. 9, positive feedback, combining for each method the noise at 4 angles using a weighted average. The positive feedback error diffusion method of the present invention exhibits a significantly better relative noise intensity at the lower end of the frequency spectrum of concern. When the spatial frequency spectrum of the noise complements the visual range of a human observer, then the normally contraindicated use of positive feedback of error actually yields a perceived image which is better than with classical negative error diffusion. In this way positive feedback error diffusion can be used to improve the digitized image portrayed on a video display.

Figure 11:
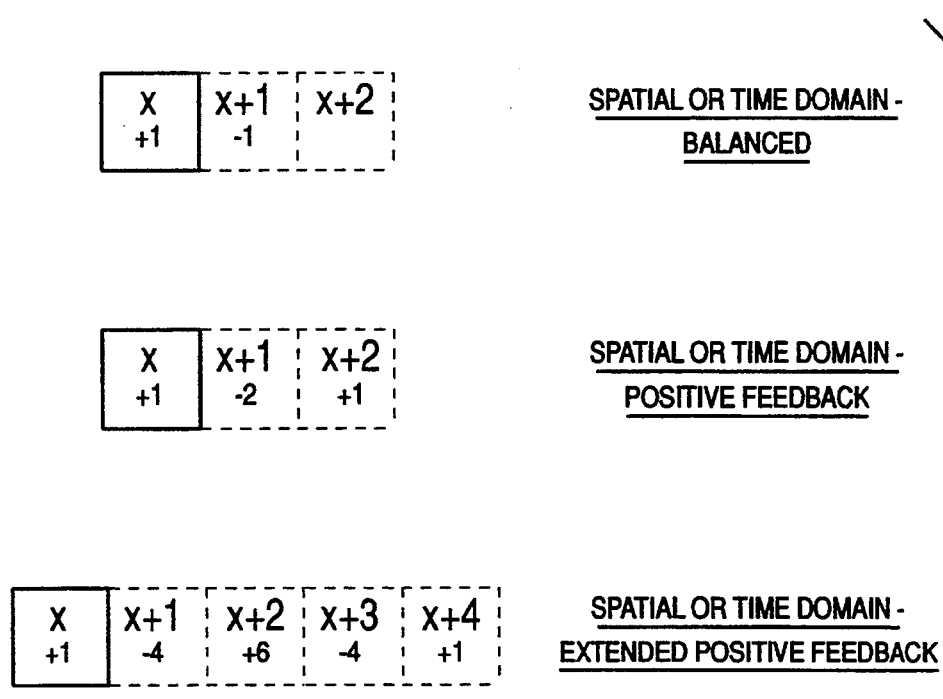
FIGS. 11 and 12 schematically illustrate various practices of one-dimensional error diffusion and the related effects upon noise intensity.
Figure 12:
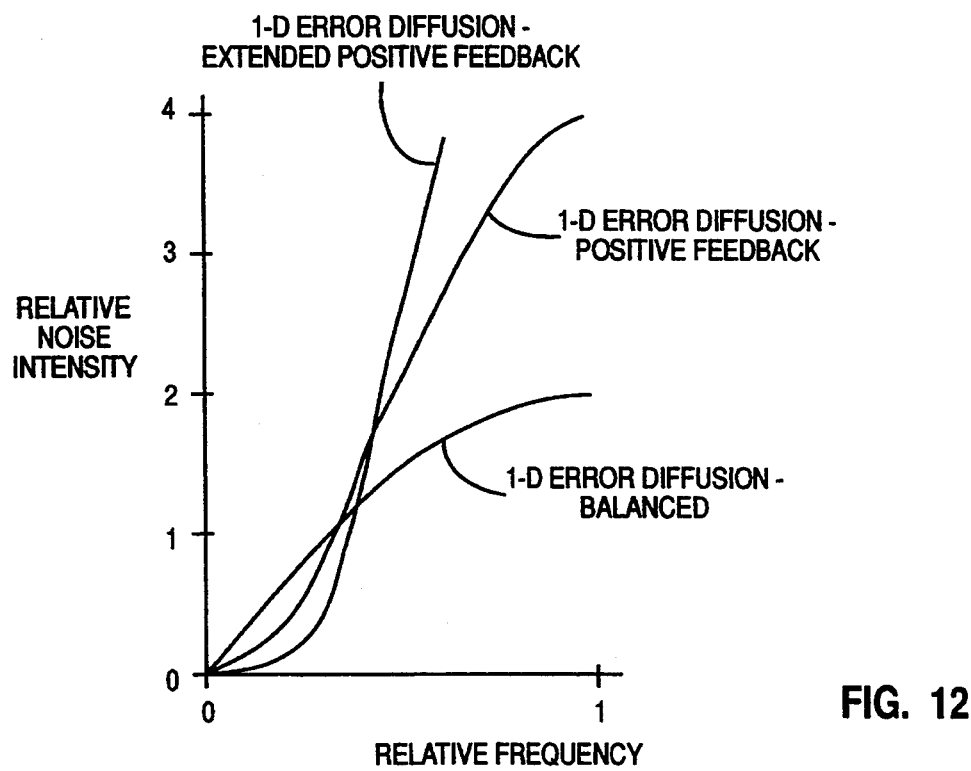

Positive feedback error diffusion is not constrained to two-dimensional applications, but may, where appropriate, be used for a video or audio signal in temporal (one-dimensional) format, or other frequency signal processing. Multi-dimensional spatial applications such as finite element modeling are also representative usages. Examples of single dimension error diffusion are schematically depicted in FIG. 11 for the conventional balanced approach, a simple positive feedback approach, and an extended positive feedback implementation. The relative noise intensities of the three are plotted in FIG. 12 for comparison. Again, positive feedback error diffusion methods improve the relative noise performance over a limited bandwidth. In the visual image processing context, the cutoff of the human visual senses were used advantageously to match the spectrums. It should be readily apparent that the same results can be accomplished with electronic or biological filters for audio and other frequency single dimension spatial or time domain signals.

Figure 13:
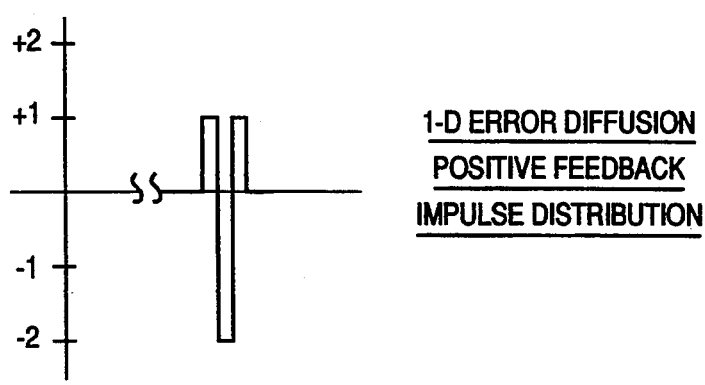
FIG. 13 schematically depicts the impulse pattern for 1-D positive feedback error diffusion.

FIG. 13 depicts the impulse pattern for the single dimension positive feedback error diffusion implementation (+1 −2 +1) depicted in FIG. 11. As shown, this implementation of error diffusion exhibits a symmetric noise impulse having a zero sum value and a 12 db per octave drop in noise intensity at low frequencies. A third order impulse, such as the extended positive feedback error diffusion implementation (+1 −4 +6 −4 +1) in FIG. 11, provides 18 db per octive descent at low frequencies but at the expense of 12 db more noise at the highest frequency when compared to the positive feedback of FIG. 11. Such higher order implementations have potential for audio signals in which the high frequencies are above the audible range of the listener.

Figure 14:
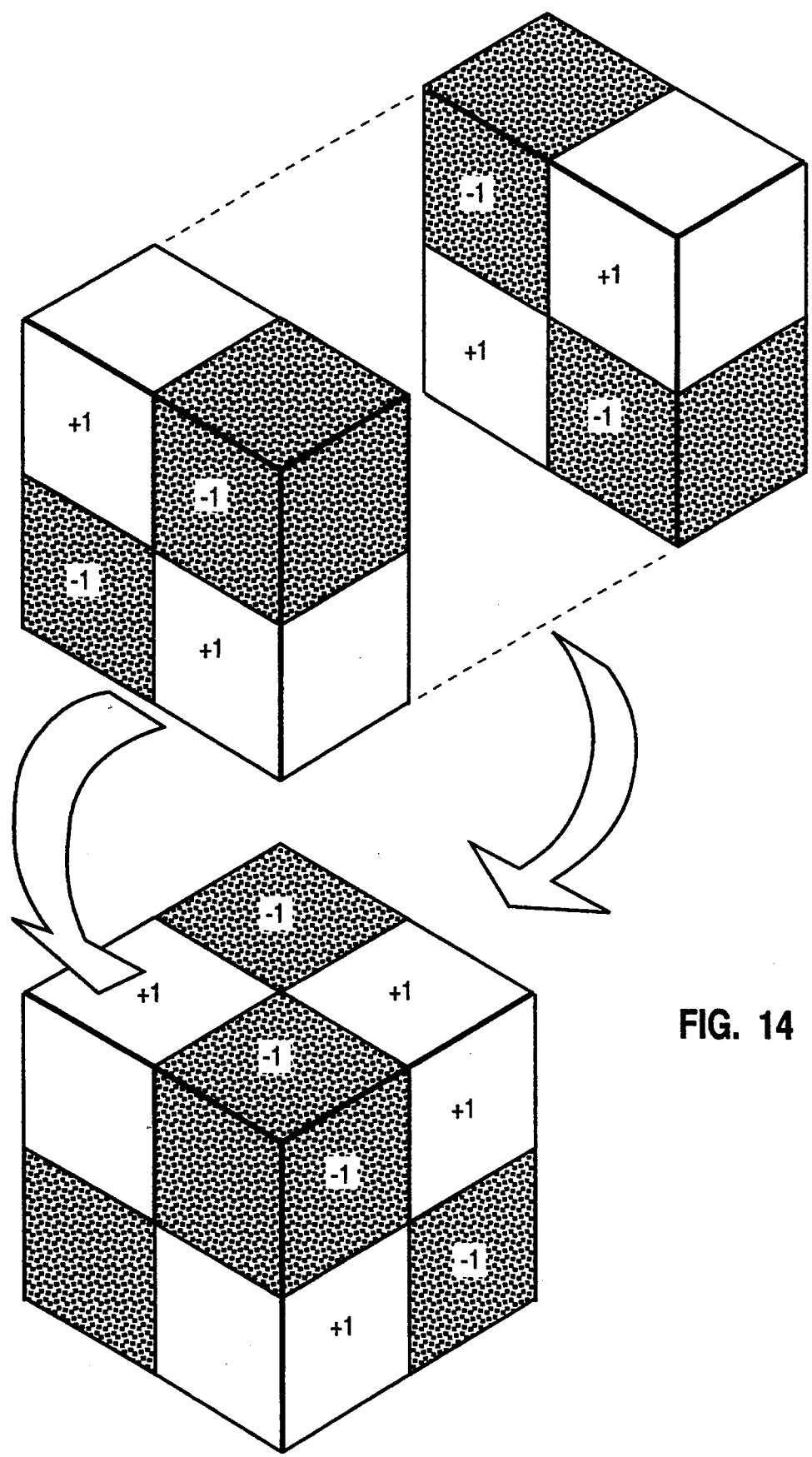
FIG. 14 schematically depicts a three-dimensional implementation using positive error diffusion.

FIG. 14 depicts a three-dimensional positive feedback implementation such as might be used in solid modeling.

Figure 15:
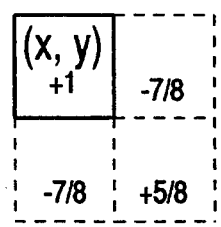
FIG. 15 schematically depicts a damped implementation of 2-D positive feedback error diffusion.

FIG. 15 depicts a two-dimensional positive feedback implementation in which the positive error subject to diffusion has been damped in relation to the sum total of the negative compensation. The damping of the positive feedback ensures stability for applications in which the signal and quantization elements are marginally stable as a consequence of calculation roundoffs, nonlinear characteristics or the like.

One method of using positive feedback error diffusion with images is illustrated algorithmically in the short program set forth below. The program is written in "C" language, a form which is a commonly understood by those practicing the art. For simplicity, boundary tests are eliminated by skipping the last row and column. A common technique, scanning alternately left-to-right and right-to-left on alternate rows to further reduce artifacts, can easily be added.

```
float      in[1000][1000];    /* IN is the original          */
                              /* image.                      */
int        out[1000][1000];   /* OUT is the product          */
                              /* of quantizing IN.           */
float      error;             /* The goal is to make         */
int        x,y;               /* OUT appear similar          */
                              /* to IN despite the           */
main( ) {                     /* errors of                   */
                              /* quantization.               */
get( );                       /* GET puts the                */
                              /* original image in IN.       */
                              /*                             */
for(y=0; y<999; y++)          /* Process the image           */
for(x=0; x<999; x++) {        /* left to right and           */
                              /* top to bottom.              */
  out[x][y]=(int)in[x][y];    /* Quantize IN pel and         */
                              /* place in OUT.               */
  error  =in[x][y]            /* Find the ERROR              */
         −(float)out[x][y];   /* introduced by this          */
                              /* quantization.               */
  in[x+1][y]   −=error;       /* Subtract ERROR from         */
  in[x][y+1]   −=error;       /* unquantized pels to         */
                              /* right and below.            */
  in[x+1][y+1]+=error; }      /* Add ERROR to diagonal       */
                              /* pel.                        */
                              /*                             */
put( ); }                     /* PUT displays                */
                              /* quantized image OUT.        */
```

Though the invention has been described and illustrated by way of specific embodiments, the underlying methods should be understood to encompass the full scope of variants defined by the claims set forth hereinafter.

I claim:

1. A method for processing signals representing pixel data to diffuse quantization errors in the pixels of a video display, comprising the steps of:

capturing a video image in a format of unquantized signals characterizing pixel data;

receiving an unquantized first signal of pixel data;

generating a quantization signal from the first signal by comparing the unquantized first signal to specified quantization levels;

generating a quantization error signal from the first signal by comparing tile unquantized first signal to the quantization of the first signal;

receiving an unquantized second signal of pixel data related in time to the first signal;

generating a quantization signal from the second signal by comparing the unquantized second signal to specified quantization levels using a positive feedback value derived from the quantization error signal of the first signal as an input during the generation of a quantization signal from the second signal;

receiving an unquantized third signal of pixel data related in time to the first and second signals;

generating a quantization signal from the third signal by comparing the unquantized third signal to specified quantization levels using a value during the quantization of the third signal to relatively offset the quantization error signal of the first signal and the positive feedback value derived from the quantization error signal of the first signal; and displaying pixels on the video display using the quantization signals for respective pixels.

2. The method recited in claim 1, wherein the quantization signal from the first signal represents a first time interval, the second quantization signal from the signal represents a second time interval, the quantization signal from the at least third signal represents an at least third time interval, and the first, second and at least third time intervals are directly related in a time sequence.

3. The method recited in claim 1, wherein the quantization signal from first signal represents first spatial location, the quantization signal from the second signal represents a second spatial location, the quantization signal from the at least third signal represents an at least third spatial location, and the first, second and at least third spatial locations are in spatial proximity.

4. The method recited in claim 2, wherein the value used to offset the quantization error signal and the positive feedback value of the quantization error signal has a magnitude of approximately twice the quantization error signal.

5. The method recited in claim 3, wherein the value used to offset the quantization error signal and the positive feedback value of the quantization error signal has a magnitude of approximately twice the quantization error signal.

6. The method recited in claim 4, wherein the first, third and second signal quantization intervals follow successively in time.

7. The method recited in claim 5, wherein the first, third and second spatial locations follow successively in spatial disposition.

8. A method for processing pixel type video data to diffuse quantization errors in the pixels of a video display, comprising the steps of:

capturing a video image in a format of unquantized signals related to pixel locations;

receiving an unquantized first pixel location signal;

generating a quantization signal from the first pixel location signal by comparing the unquantized first pixel location signal to specified quantization levels;

generating a first quantization error signal for the first pixel location by comparing the unquantized first pixel location signal to the quantization of the first pixel location signal;

receiving an unquantized second pixel location signal;

generating a quantization of the second pixel location signal by comparing the unquantized second pixel location signal to specified quantization levels using as positive feedback a signal related to the first quantization error signal in the quantization at the second pixel location, the second pixel location being situated at a diagonal to the first pixel location;

receiving unquantized third and fourth pixel location signals;

generating quantization signals from the third and fourth pixel location signals by comparing the unquantized third and fourth pixel location signals to specified quantization Levels using complement signal values to relatively offset the first quantization error signal and the positive feedback signal related to the first quantization error signal during the quantization at third and fourth pixel locations, the third and fourth pixel locations being situated symmetrically orthogonal to a diagonal defined by the first and second pixel locations; and displaying pixels on the video display using the quantization signals for respective pixels, 9. The method recited in claim 8, wherein the magnitudes of the positive feedback signal, third location complement signal, and fourth location complement signal are substantially equal to the first quantization error signal.

10. The method recited in claim 9, wherein the four locations defined a square shaped pattern of pixels for a video display.

11. Apparatus for processing signals representing pixel data using quantization error diffusion, comprising:

means for capturing a video image in a format of unquantized signals characterizing pixel data;

means for receiving an unquantized first signal of pixel data;

means for generating a quantization signal from the first signal by comparing the unquantized first signal to specified quantization levels:

means for determining a quantization error signal for the first signal by comparing the unquantized first signal to the quantization signal of the first signal;

means for receiving an unquantized second signal of pixel data;

means for generating a quantization signal from the second signal by comparing the unquantized second signal to specified quantization levels using a positive feedback signal derived from the quantization error signal of the first signal, as an input during the quantization of the second signal;

means for receiving an unquantized third signal of pixel data;

means for quantizing the third signal using a signal which relatively offsets the quantization error signal of the first signal and the positive feedback signal of the quantization error signal; and means for displaying pixels on a video display using the quantized signals for respective pixels.

12. A system for processing video signals representing pixel data by diffusion of quantization errors, comprising:

means for capturing a video image of unquantized signals characterizing pixel data by pixel location on a display;

means for receiving an unquantized signal representing a first location pixel;

means for generating a quantization signal from the unquantized first location pixel signal by comparing the unquantized first location pixel signal to specified quantization levels;

means for generating a first quantization error signal for the first location pixel;

means for receiving an unquantized signal representing a second location pixel;

means for using as positive feedback a signal related to the first quantization error signal in the quantization of the second location pixel, the second location pixel being located at a diagonal to the location of the first location pixel;

means for receiving unquantized signals for third and fourth location pixels;

means for using complement signals to relatively offset the first quantization error signal and the positive feedback signal related to the first quantization error signal in the quantization of third and fourth pixel location signals, the third and fourth pixels being located symmetrically orthogonal to a diagonal defined by the first and second pixel locations; and means for displaying pixels on a video display using the quantization signals for respective pixel locations.

* * * * *

UNITED STATES PATENT AND TRADEMARK OFFICE
CERTIFICATE OF CORRECTION

PATENT NO. : 5,373,455
DATED : December 13, 1994
INVENTOR(S) : Albert D. Edgar

It is certified that error appears in the above-indentified patent and that said Letters Patent is hereby corrected as shown below:

Col. 1, line 6, delete "07/706,566", insert --07/706,466--;

Col. 2, line 65, delete "(schematically", insert --schematically--;

Col. 8, line 28, after "from" insert --the--;
after "represents" insert --a--; and Col. 9, line 10, delete "Levels", insert --levels--.

Signed and Sealed this

Twentieth Day of August, 1996

Attest:

BRUCE LEHMAN

Attesting Officer         Commissioner of Patents and Trademarks